United States Patent
Robinson et al.

(10) Patent No.: US 10,250,804 B2
(45) Date of Patent: Apr. 2, 2019

(54) INDUCTION-POWERED CAMERA

(71) Applicant: Vivint, Inc., Provo, UT (US)

(72) Inventors: Jared Robinson, Lehi, UT (US); Jason Flint, Provo, UT (US)

(73) Assignee: Vivint, Inc., Provo, UT (US)

( * ) Notice: Subject to any disclaimer, the term of this patent is extended or adjusted under 35 U.S.C. 154(b) by 216 days.

(21) Appl. No.: 14/680,793

(22) Filed: Apr. 7, 2015

(65) Prior Publication Data

US 2016/0301867 A1 Oct. 13, 2016

(51) Int. Cl.
- H04N 7/18 (2006.01)
- H04N 5/232 (2006.01)
- H02J 7/02 (2016.01)

(52) U.S. Cl.
CPC ......... H04N 5/23241 (2013.01); H02J 7/025 (2013.01); H04N 5/23206 (2013.01); H04N 7/183 (2013.01)

(58) Field of Classification Search
CPC ........... H04N 5/23241; H04N 5/23206; H04N 7/183; H02J 7/025
USPC ....................................................... 348/143
See application file for complete search history.

(56) References Cited

U.S. PATENT DOCUMENTS

| | | | |
|---|---|---|---|
| 7,318,564 B1 | 1/2008 | Marshall | |
| 8,767,071 B1 | 7/2014 | Marshall | |
| 2007/0279002 A1* | 12/2007 | Partovi | H02J 7/0027 320/115 |
| 2013/0162203 A1 | 6/2013 | Kamata | |
| 2013/0285606 A1* | 10/2013 | Ben-Shalom | H01F 38/14 320/108 |
| 2015/0363989 A1* | 12/2015 | Scalisi | G07C 9/00904 348/143 |
| 2016/0127643 A1* | 5/2016 | Huerta | H04N 5/23241 348/211.2 |
| 2016/0294227 A1* | 10/2016 | Podkamien | H02J 5/00 |

FOREIGN PATENT DOCUMENTS

| | | |
|---|---|---|
| JP | 2013132120 | 7/2013 |
| KR | 20110039602 | 4/2011 |

OTHER PUBLICATIONS

English Machine Translation of KR20110039602. Apr. 20, 2011.
English Machine Translation of JP2013132120. Jul. 4, 2013.

* cited by examiner

*Primary Examiner* — Richard T Torrente
(74) *Attorney, Agent, or Firm* — Holland & Hart LLP

(57) ABSTRACT

An induction-powered camera capable of being installed external to a building without any building alterations is described. The induction-powered camera may include a continuous power source. The induction-powered camera may transmit one or more images to a control panel associated with security and/or automation systems. The induction-powered camera may be movable and/or removable with undue burden. An apparatus for a security and/or automation system is described. The apparatus may include a first half of the apparatus and an electricity transmission unit positioned within the first half. An electricity receiving unit may be positioned a predetermined distance away from the electricity transmission unit. The electricity receiving unit proximate a second half of the apparatus and a camera may be proximate the second half of the apparatus, the camera powered by the electricity receiving unit.

17 Claims, 10 Drawing Sheets

INDUCTION-POWERED CAMERA

BACKGROUND

The present disclosure, for example, relates to security and/or automation systems, and more particularly to capturing one or more outdoor images without significant alterations to a building.

Security and automation systems are widely deployed to provide various types of communication and functional features such as monitoring, communication, notification, and/or others. These systems may be capable of supporting communication with a user through a communication connection or a system management action.

Cameras for security and/or automation systems may require a dedicated power source as well as means for transferring data to a control panel of the security and/or automation system. Wiring external devices to a building may present challenges. This may require permanent alterations to a building such as running electricity wires and/or making one or more alterations to an exterior of a building. Holes may need to be drilled through one or more exteriors to a building, wires may need to be run, and the like. Additionally, drilling holes through an exterior may open the potential for one or more pests to enter the building, may be difficult to seal out weather, and the like. The cost to permanently install an external monitoring system may be high due to the complexity of the system. Additionally, a user may not wish to make the permanent alterations to a building to accommodate the external monitoring system. This may prevent the install for external security detection and/or precautions despite a growing need.

SUMMARY

The disclosure may relate to an induction-powered camera capable of being installed external to a building without any building alterations. The induction-powered camera may have a continuous power source without the concern of one or more limited power source draining. The induction-powered camera may transmit one or more images to a control panel associated with security and/or automation systems. The induction-powered camera may be movable and/or removable with undue burden.

In one embodiment, an apparatus for a security and/or automation system is described. The apparatus may include a first half of the apparatus and an electricity transmission unit positioned within the first half. An electricity receiving unit may be positioned a predetermined distance away from the electricity transmission unit. The electricity receiving unit proximate a second half of the apparatus and a camera may be proximate the second half of the apparatus, the camera powered by the electricity receiving unit.

A first magnet may be proximate the first half and a second magnet proximate the second half. The first and second magnet may be positioned to align the electricity transmission unit and the electricity receiving unit. A light source may be proximate the second half of the apparatus, wherein the light source may illuminate when the electricity receiving unit is activated. Activating the electricity receiving unit may comprise transferring power from the electricity transmission unit to the electricity receiving unit. An antenna proximate the second half.

An audio recording device may be proximate the second half, the audio recording device may be powered by the electricity receiving unit. The apparatus may further include a coil of wire, a chip proximate the coil of wire, connecting to the coil of wire via a connecting wire, and a continuous power supply proximate the coil of wire. The apparatus may further include a second coil of wire, a second chip proximate the coil of wire, connecting to the coil of wire via a second connecting wire, and the camera proximate the second chip, positioned to receive a source of power from the second chip and second coil of wire.

An optical data transmission unit may be proximate the second half. Additionally, an optical data receiving unit may be proximate the first half. The two units may be positioned to transmit data there between. A battery proximate the second half, the battery positioned to receive electricity from the electricity receiving unit. A speaker may be proximate the second half. The first half and second half may transfer data via a near field communication protocol.

In further embodiments, a method for security and/or automation systems is described. The method may include generating a command to activate a mobile camera unit based at least in part on one or more security parameters, wherein the mobile camera unit is powered by induction power. The method may transmit the command to the mobile camera unit; receiving data from the mobile camera unit and analyze the data from the mobile camera unit. The method may generate the command based on one or more emergency alerts. The method may transmit the received data to one or more emergency personnel. The method may analyze the data based on one or more emergency alerts, wherein analyzing the data comprises analyzing one or more images to identify motion proximate the mobile camera unit.

In a further embodiment, an apparatus for security and/or automation systems is described. The apparatus may include a first half of the apparatus and an electricity transmission unit positioned within the first half. An electricity receiving unit may be positioned a predetermined distance away from the electricity transmission unit. The electricity receiving unit proximate a second half of the apparatus and a camera may be proximate the second half of the apparatus, the camera powered by the electricity receiving unit. The apparatus may further include a processor, memory in electronic communication with the processor, and instructions stored in the memory. The instructions may be executable by the processor to activate the camera based at least in part on one or more commands.

The instructions may be further executable to stream image data to the control panel in response to one or more commands. The instructions may be further executable to connect to a control panel associated with an automation system. The instructions may be further executable to rotate a viewing point of the camera.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some embodiments, security and/or automation systems may have one or more externally-mounted cameras. The cameras may capture video or still images of a building's surroundings. The cameras may be general security cameras sending information to a central hub for review, or may provide information should an unlawful or undesirable event occur. Hard wiring the cameras may be costly and may result in permanent fixtures outside of a building. The permanent fixtures may not be mobile. Additionally, in some instances, an external camera may not be necessary for permanent application. A user may be experiencing some sort of nuisance or other problem they wish to monitor for a short duration of time. The permanence and expense of mounting a wired external camera may not be in line with the need.

Instead, a mobile external camera unit may be installed without any modifications to a building. The camera may be connected to a continuous power supply negating the need for batteries as a primary power source. The external camera unit may comprise an indoor unit and an outdoor unit. The indoor unit and the outdoor unit may be proximate each other and may exchange power through one or more wireless mediums. The external camera unit may capture one or more images. The images may comprise still images, moving images, 3-dimensional rendering, or any representation of physical things. The external camera may additionally capture one or more audio files.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
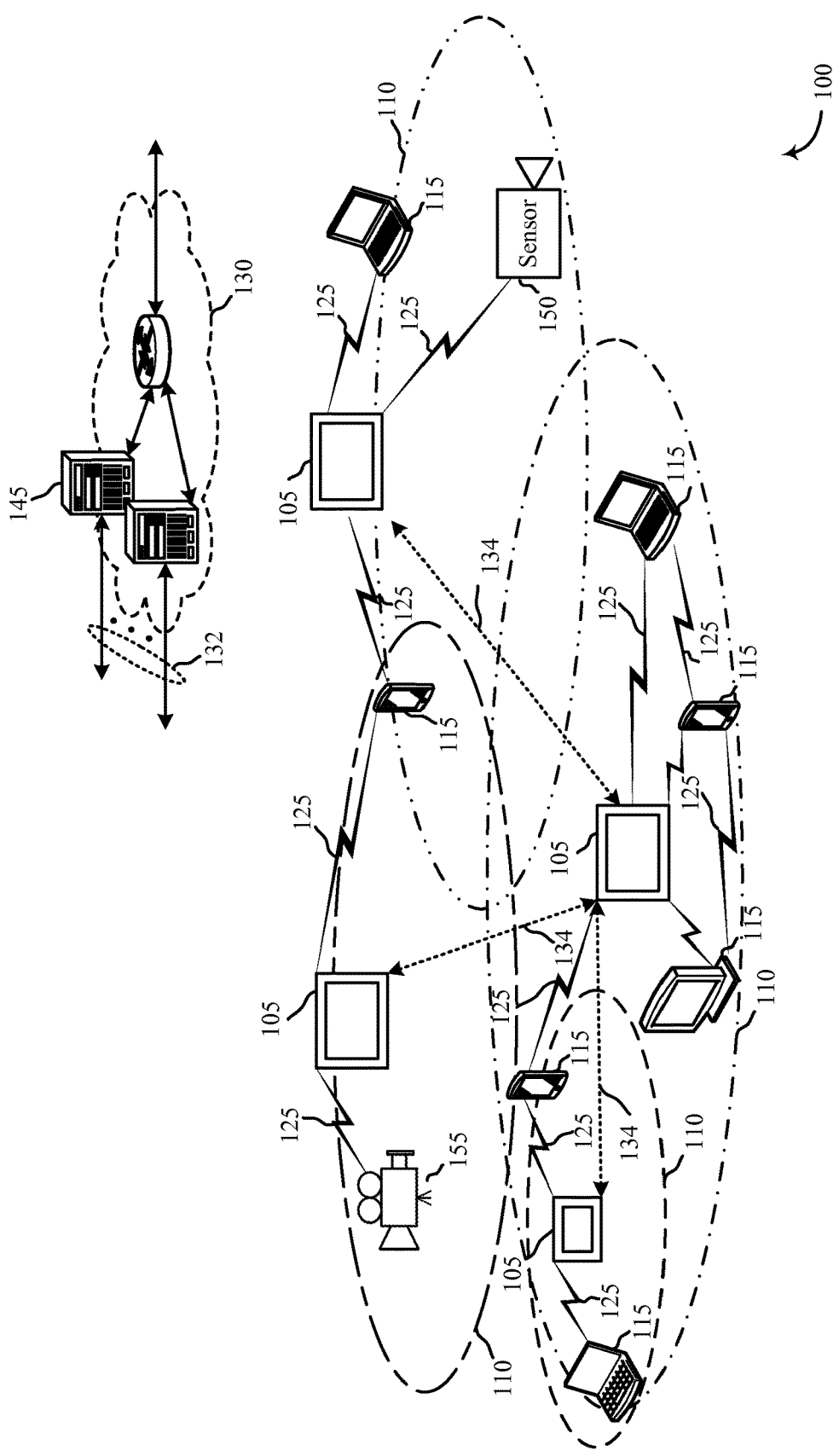
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, sensors 150, and/or external cameras 155. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communication with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server (such as the remote servers 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system.

The external cameras 155 may be external to a building but may receive power from a continuous power supply located internally in the building. The external camera 155 may be a mobile unit and may not require rewiring or alterations to a building to install and/or reposition. The external cameras 155 may receive power from an induction source, which may also be used to transmit one or more pieces of information. A device 115, a sensor 150, and/or an external camera 155 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 and/or a sensor 150 to a control panel 105, and/or downlink (DL) transmissions, from a control panel 105 to a device 115 and/or sensor 150. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, control panels 105, devices 115, sensors 150, and/or external cameras 155 may include one or more antennas for employing antenna diversity schemes to improve communication quality and reliability between control panels 105, devices 115, sensors 150, and/or external cameras 155. Additionally or alternatively, control panels 105, devices 115, sensors 150, and/or external cameras 155 may employ multiple-input, multiple-output (MIMO) techniques that may take advantage of multi-path, mesh-type environments to transmit multiple spatial layers carrying the same or different coded data.

While the devices 115, sensors 150, and/or external cameras 155 may communicate with each other through the control panel 105 using communication links 125, the devices 115, sensors 150, and/or external cameras 155 may also communicate directly with one or more other devices 115, sensors 150, and/or external cameras 155 via one or more direct communication links 125. Two or more devices 115, sensors 150, and/or external cameras may communicate via a direct communication link 125 when both devices 115, sensors 150, and/or external cameras 155 are in the geographic coverage area 110 or when one or neither devices 115, sensors 150, and/or external cameras 155 are within the geographic coverage area 110. Examples of direct communication links 125 may include Wi-Fi Direct, BLUETOOTH®, wired, and/or, and other P2P group connections. The devices 115, sensors 150, and/or external cameras 155 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

The control panel 105 may monitor the external camera 155 and may trigger an alert to a user based on one or more images captured by the external camera 155. For example, the external camera 155 may operate to capture one or more images or may operate in conjunction with one or more sensors 150 to capture images in relation or in conjunction to another event. For example, the control panel 105 may command the external camera 155 to capture one or more images when a motion sensor 150 proximate the external camera 155 is activated. In another embodiment, the control panel 105 may command the external camera 155 to capture a continuous stream of imagery between predetermined times periods. In yet another embodiment, the control panel 105 may command the external camera 155 to continuously capture images and stream the images back to the control panel 105 for storage and potential review.

Figure 2:
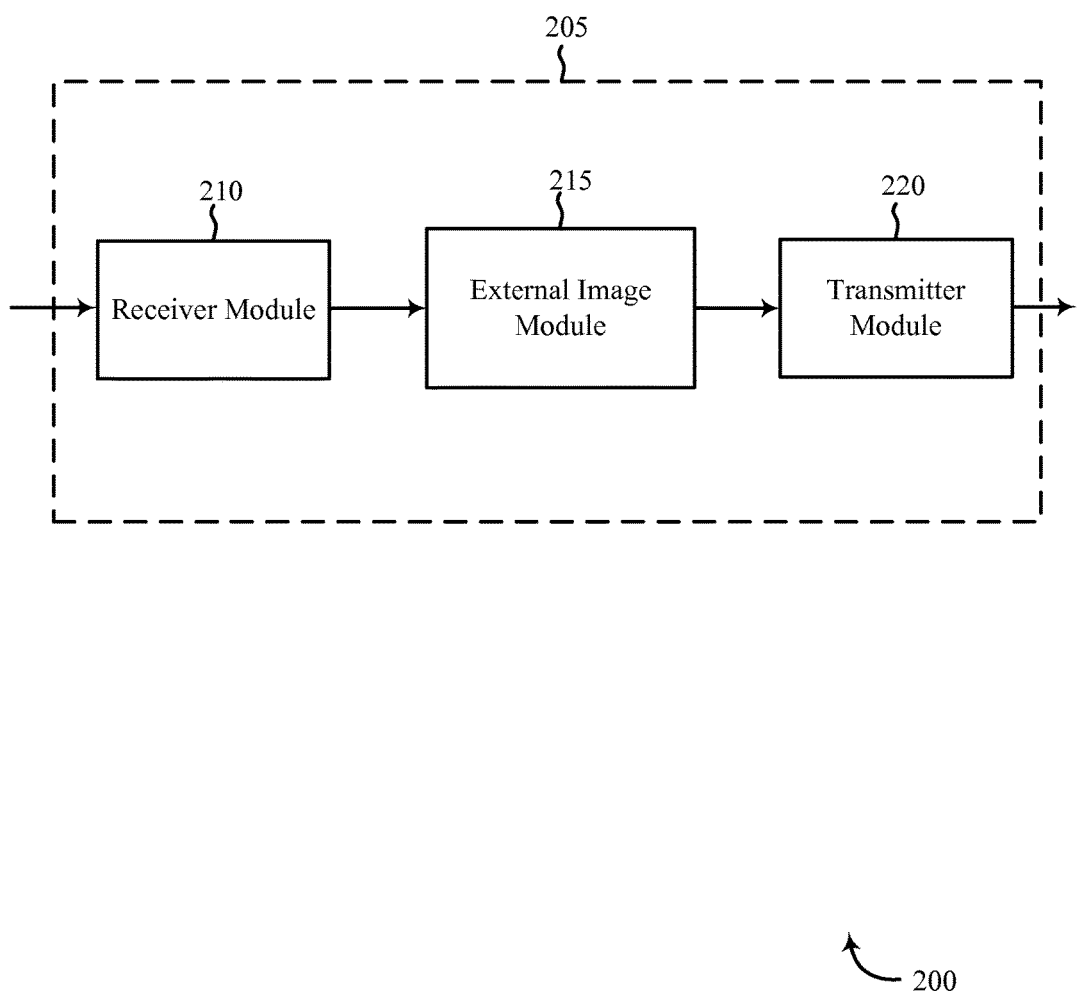
FIG. 2 shows a block diagram of a device relating to a security and/or an automation system, in accordance with various aspects of this disclosure.

FIG. 2 shows a block diagram 200 of an control panel 205 for use in electronic communication, in accordance with various aspects of this disclosure. The control panel 205 may be an example of one or more aspects of a control panel 105 described with reference to FIG. 1. The control panel 205 may include a receiver module 210, an external image module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more inputs from a user or a sensor, one or more images, or the like. Information may be passed on to the external image module 215, and to other components of the control panel 205.

The external image module 215 may control one or more aspects of an external camera (e.g. external camera 155, FIG. 1). The external image module 215 may receive one or more inputs from a sensor and/or a user. The external image module 215 may use the information received and generate one or more commands for an external camera associated with the automation system (e.g. external camera 155). The external image module 215 may additionally receive one or more images from the external camera. The external image module 215 may evaluate and analyze the images received, may store the images, may forward one or more images to a user, or the like.

The transmitter module 220 may transmit the one or more signals received from other components of the control panel 205. The transmitter module 220 may transmit one or more commands to an external camera, one or more alerts or messages to a user, and the like. In some examples, the transmitter module 220 may be collocated with the receiver module 210 in a transceiver module.

Figure 3:
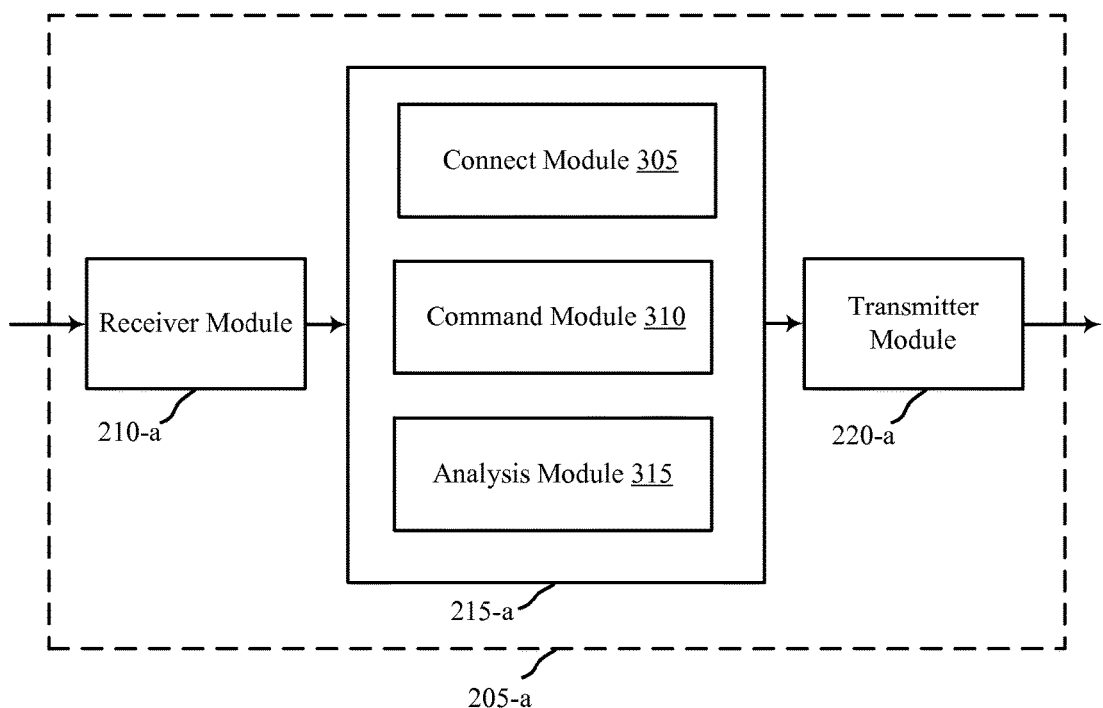
FIG. 3 shows a block diagram of a device relating to a security and/or an automation system, in accordance with various aspects of this disclosure.

FIG. 3 shows a block diagram 300 of a control panel 205-a for use in wireless communication, in accordance with various examples. The control panel 205-a may be an example of one or more aspects of a control panel 105 described with reference to FIG. 1. It may also be an example of a control panel 205 described with reference to FIG. 2. The control panel 205-a may include a receiver module 210-a, an external image module 215-a, and/or a transmitter module 220-a, which may be examples of the corresponding modules of control panel 205. The control panel 205-a may also include a processor. Each of these components may be in communication with each other. The external image module 215-a may include a connect module 305, a command module 310, and an analysis module 315. The receiver module 210-a and the transmitter module 220-a may perform the functions of the receiver module 210 and the transmitter module 220, of FIG. 2, respectively.

The components of the control panel 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The connect module 305 may connect one or more mobile external cameras (e.g. external camera 155) to the control panel 205-a. For example, there may be a linking feature on the external camera which may connect to a wireless network associated with the control panel 205-a. The connect module 305 may detect a Bluetooth signal or other wireless signal used to connect devices to the control panel 205-a. Connecting the external camera may additionally include setting up one or more monitoring parameters of the camera. For example, setting up the camera may comprise assigning the region being observed to the control panel 205-a. If a sensor is proximate the camera, the sensor may additionally be linked to the camera. In another embodiment, the camera itself may comprise one or more sensors. The sensors may additionally be connected to the control panel 205-a. The sensors may be registered with the control panel 205-a. Registering the sensor may comprise setting up the sensing capabilities and linking the sensor to the camera and potential images captured by the camera.

The command module 310 may receive one or more pieces of information from one or more sources and may generate one or more commands based at least in part on one or more activation parameters. The activation parameters may be based at least in part on received information. The information may comprise one or more inputs from a user, a sensor, or a remote server. The information may comprise a request from a user to record images from the external camera. For example, a user may be concerned with one or more events or incidences and may request a camera to capture images. The request may specify a length of time as well, a predetermined time frame and duration, etc. The request may additionally comprise one or more variables. For example, the user may request images captured from a specific external camera when a sensor proximate the camera is activated or captures one or more requirements. For example, the user may request one or more images to be captured when a motion sensor proximate the external camera is activated.

The command module 310 may generate and send one or more commands based on one or more security parameters. The security parameters may be based at least in part on input from one or more sensors. For example, one or more sensors may activate a security alert within the automation system. The command module 310 may generate and send a command to the external camera to begin image capturing upon the activation of the security alert. The security parameters may additionally comprise one or more emergency alerts from a sensor, another module proximate the security sensor, a public emergency alert, or the like.

The command module 310 may generate one or more commands in response to a request from a remote server. The remote server may track one or more community, state, city, or other governmental alerts. The alerts may comprise one or more safety concerns, environmental concerns, or the like. For example, the alert may initiate the command module 310 to generate and send a command for the external camera to immediately begin capturing external images.

The analysis module 315 may gather one or more images from the one or more external cameras. The analysis module 315 may store the images, analyze the images, and send the images to a user or remote server, or the like. For example, if the external camera is set to continuously collect images, the control panel 205-a may gather and store the images. The control panel 205-a may store the images locally or remotely. For example, the control panel 205-a may store the images in a memory or may transfer the images to a remote storage (e.g. remote storage 145). In some embodiments, the control panel 205-a may retain a predetermined amount or duration of images locally and may transfer the older images to the remote server. This may allow the more immediate images to be displayed to a user if necessary or requested.

In some embodiments, the analysis module 315 may attempt to analyze the images. For example, the analysis module 315 may attempt to identify movement in an image. The analysis module 315 may additionally attempt to recognize and determine the object moving. If the object is a person, the analysis module 315 may use facial recognition to determine if the person is a user of the automation system, a person requiring an alert, or the like. For example, if a user has a restraining order, the user may load the undesirable person's facial imagery into the control panel 205-*a* and the analysis module 315 may review identified persons to determine if the undesirable person is within a predetermined proximity of a home. If the analysis module 315 cannot recognize a person, the analysis module 315 may transmit the image to a user of the automation system for further information. The user may identify the person, or may not recognize the person and may generate an alert.

Figure 4:
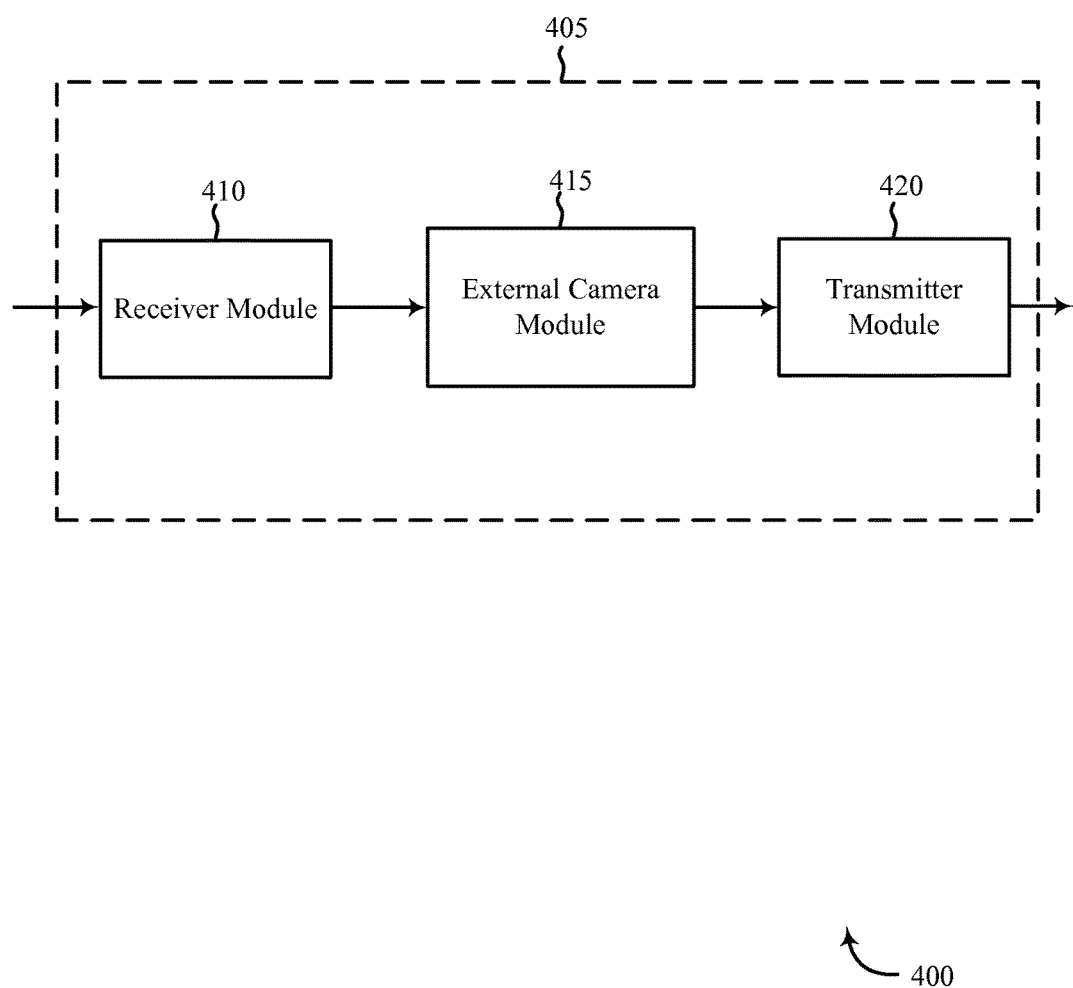
FIG. 4 shows a block diagram relating to a security and/or an automation system, in accordance with various aspects of this disclosure.

FIG. 4 shows a block diagram 400 of an external camera 405 for use in electronic communication, in accordance with various aspects of this disclosure. The external camera 405 may be an example of one or more aspects of an external camera 155 described with reference to FIG. 1. The external camera 405 may include a receiver module 410, an external camera module 415, and/or a transmitter module 420. The external camera 405 may also be or include a processor. Each of these modules may be in communication with each other—directly and/or indirectly.

The components of the external camera 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 410 may receive information such as packets, user data, and/or control information associated with various information channels (e.g., control channels, data channels, etc.). The receiver module 410 may be configured to receive one or more inputs or commands from a control panel. Information may be passed on to the external camera module 415, and to other components of the external camera 405.

The external camera module 415 may control one or more aspects of the external camera (e.g. external camera 155, FIG. 1). The external camera module 415 may receive one or more inputs from a control panel (e.g. control panel 105 and/or 205). The inputs may comprise a connecting request and/or a command. The connecting request may facilitate creating a communicative connection between the control panel and the external camera 405. The commands may direct and/or monitor one or more settings of the external camera 405. The external camera module 415 additionally may receive one or more visual and/or audio inputs from a visual and/or audio capturing apparatus proximate the external camera 405. In some embodiments, the visual and/or audio capturing apparatus may be located within the same housing.

The transmitter module 420 may transmit the one or more signals received from other components of the external camera 405. The transmitter module 420 may transmit one or more images and/or audio files to the control panel. In some examples, the transmitter module 420 may be collocated with the receiver module 410 in a transceiver module.

Figure 5:
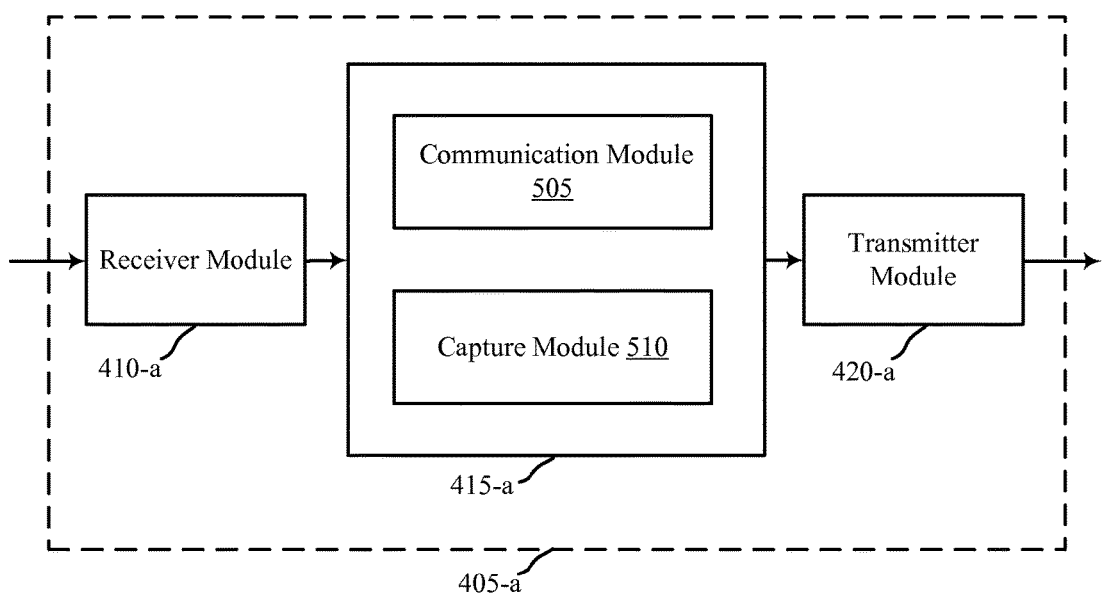
FIG. 5 shows a block diagram relating to a security and/or an automation system, in accordance with various aspects of this disclosure.

FIG. 5 shows a block diagram 500 of an external camera 405-*a* for use in wireless communication, in accordance with various examples. The external camera 405-*a* may be an example of one or more aspects of an external camera 155 described with reference to FIG. 1. It may also be an example of an external camera 405 described with reference to FIG. 2. The external camera 405-*a* may include a receiver module 410-*a*, an external camera module 415-*a*, and/or a transmitter module 420-*a*, which may be examples of the corresponding modules of external camera 405. The external camera 405-*a* may also include a processor. Each of these components may be in communication with each other. The external camera module 415-*a* may include a communication module 505 and a capture module 510. The receiver module 410-*a* and the transmitter module 420-*a* may perform the functions of the receiver module 410 and the transmitter module 420, of FIG. 4, respectively.

The components of the external camera 405-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The communication module 505 may facilitate and interpret commands and/or communications with a control panel (e.g. control panel 105, 205). The communication module 505 may receive one or more connection requests from the control panel and may wirelessly connect with the control panel. In another embodiment, the external camera 405-*a* may connect to the control panel using one or more wired connections. The communication module 505 may activate one or more audiovisual components of the external camera 405-*a*. The audiovisual components may comprise strictly visual components, strictly audio components, a combination audiovisual components, or combinations thereof. For the purposes of this disclosure, the term audiovisual will comprise any combination of these components.

The commands may require one or more audiovisual components to commence, cease, or alter one or more recording settings. The one or more recording settings may additionally comprise changing a view of the camera. For example, the external camera 405-*a* may be mounted on a motion apparatus which may allow the external camera 405-*a* to swivel and/or rotate in a multitude of directions.

The communication module 505 may send one or more audiovisual files to the control panel. The communication module 505 may receive one or more files from the capture module 510. The communication module 505 may send them via one or more wireless or wired connections to the control panel. In some embodiments, the communication module 505 may compress and/or divide the file into multiple smaller sub-files for ease of transmission. If the file is subdivided, the sub-files may comprise one or more identifiers to accurately recompile the file into its original state.

The capture module 510 may capture one or more audiovisual data, images, files, or the like. The capture module 510 may alter the data gathering apparatus to record only one of sound, image, or both. The capture module 510 may locally store the files prior to sending them to the control panel. In another embodiment, the capture module 510 may directly stream the gathered data to the control panel. In yet another embodiment, the capture module 510 may stream the data to the control panel but have limited emergency storage capabilities to store the data if the connection fails.

Figure 6:
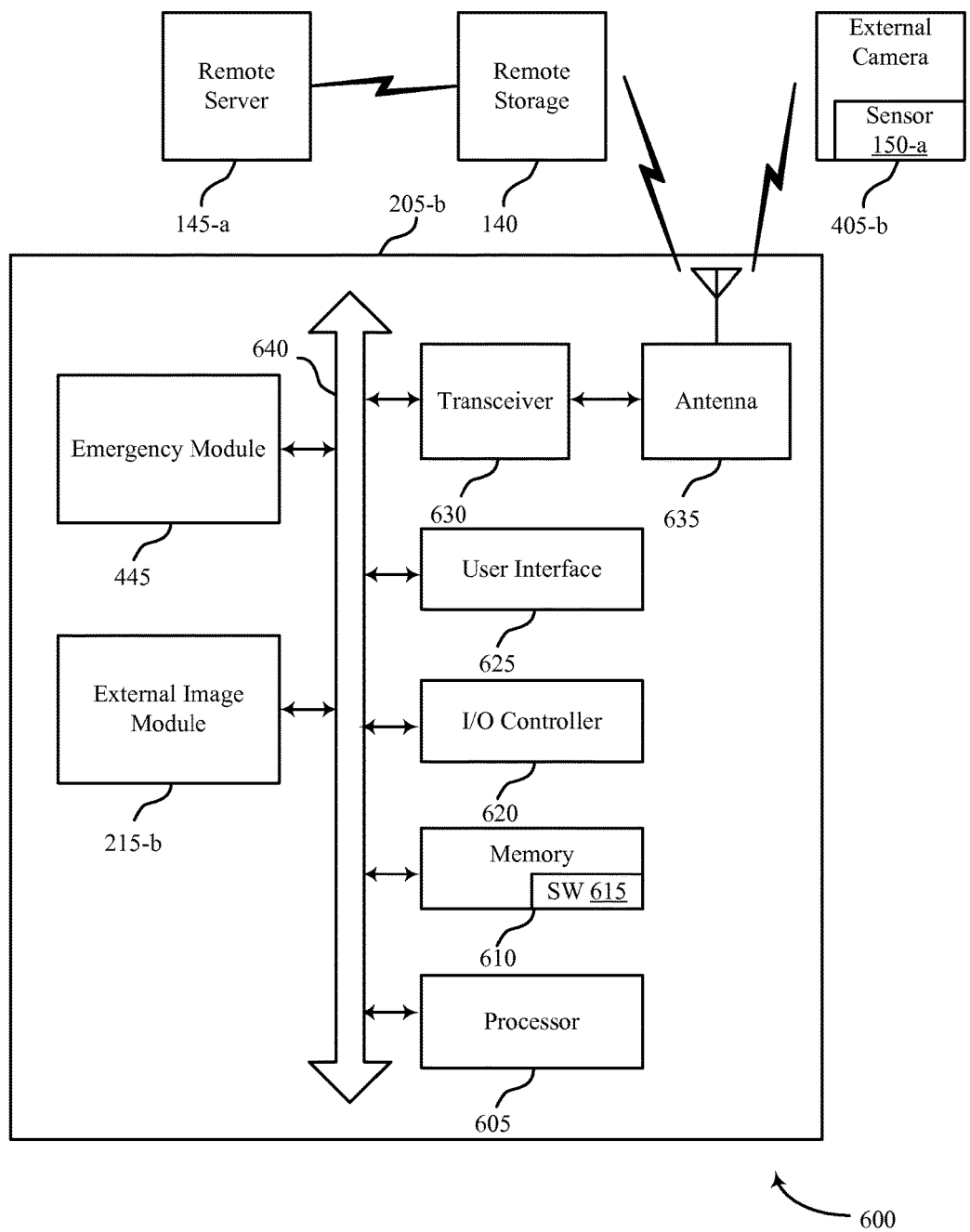
FIG. 6 shows a block diagram relating to a security and/or an automation system, in accordance with various aspects of this disclosure.

FIG. 6 shows a system 600 for use in portable external camera systems, in accordance with various examples. System 600 may include a control panel 205-*b*, which may be an example of the control panels 105 of FIG. 1. Control panel 205-*b* may also be an example of one or more aspects of control panels 205 and/or 205-*a* of FIGS. 2 and 3.

The control panel 205-*b* may include an emergency module 445. The control panel 205-*b* may also include external image module 215-*b*, which may be an example of the external image module 215 described with reference to FIGS. 2 and/or 3. In some embodiments, the terms a control panel and a control device are used synonymously.

Control panel 205-*b* may also include components for bi-directional voice and data communications including components for transmitting communications and components for receiving communications. For example, control panel 205-*b* may communicate bidirectionally with one or more of external camera 405-*b*, one or more sensors 150-*a*, remote storage 140, and/or remote server 145-*a*, which may be an example of the remote server of FIG. 1. This bi-directional communication may be direct (e.g., control panel 205-*b* communicating directly with remote storage 140) or indirect (e.g., control panel 205-*b* communicating indirectly with remote server 145-*a* through remote storage 140).

The emergency module 645 may relay one or more audio, visual, or audiovisual files to emergency personnel based at least in part on one or more emergency parameters. For example, the automation system may comprise one or more emergency status alerts and/or emergency status receptors. The emergency status alerts may comprise one or more settings unique to the automation system. The emergency status alert may be automatically activated due to one or more inputs received by the control panel 205-*b*. The emergency status alert may additionally be generated by a user. In some embodiments, if emergency personnel are contacted, the emergency module 645 may transmit audiovisual data from an external camera 405-*b* to the emergency personnel. Additionally, the control panel 205-*b* may be connected to one or more public emergency alert systems. Depending upon the specifics of the alert, the control panel 205-*b* may activate one or more external cameras 405-*b* and either analyze the data locally or send the data to one or more emergency personnel to analyze.

The external image module 215-*b* may direct and/or receive information from one or more external cameras based at least in part on activation parameters as described above with reference to FIG. 3. For example, the activation parameters may comprise one or more requirements to be satisfied prior to activating one or more external parameters. The requirements may comprise user input, security settings, emergency alarm system warnings, and the like. The external image module 215-*b* may gather and analyze information provided by an external camera based at least in part on the one or more activation parameters.

Control panel 205-*b* may also include a processor module 605, and memory 610 (including software/firmware code (SW) 615), an input/output controller module 620, a user interface module 625, a transceiver module 630, and one or more antennas 635 each of which may communicate—directly or indirectly—with one another (e.g., via one or more buses 640). The transceiver module 630 may communicate bi-directionally—via the one or more antennas 635, wired links, and/or wireless links—with one or more networks or remote devices as described above. For example, the transceiver module 630 may communicate bi-directionally with one or more of external camera 405-*b*, remote storage 140, and/or remote server 145-*a*. The transceiver module 630 may include a modem to modulate the packets and provide the modulated packets to the one or more antennas 635 for transmission, and to demodulate packets received from the one or more antenna 635. While a control panel or a control device (e.g., 205-*b*) may include a single antenna 635, the control panel or the control device may also have multiple antennas 635 capable of concurrently transmitting or receiving multiple wired and/or wireless transmissions. In some embodiments, one element of control panel 205-*b* (e.g., one or more antennas 635, transceiver module 630, etc.) may provide a direct connection to a remote server 145-*a* via a direct network link to the Internet via a POP (point of presence). In some embodiments, one element of control panel 205-*b* (e.g., one or more antennas 635, transceiver module 630, etc.) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 635 and/or transceiver module 630 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 635 may receive signals or information specific and/or exclusive to itself. In other embodiments, each antenna 635 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 600 via a network using one or more wired and/or wireless connections. The one or more sensors 150-*a* may be proximate the external camera 405-*b*. The external camera 405-*b* may capture one or more outdoor audiovisual signals. In some embodiments, the external camera 405-*b* may be independent of the sensors 150-*a*. The external camera 405-*b* may connect to some element of the system 600 via using one or more wired and/or wireless connections.

In some embodiments, the user interface module 625 may include an audio device, such as an external speaker system, an external display device such as a display screen, and/or an input device (e.g., remote control device interfaced with the user interface module 625 directly and/or through I/O controller module 620).

One or more buses 640 may allow data communication between one or more elements of control panel 205-*b* (e.g., processor module 605, memory 610, I/O controller module 620, user interface module 625, etc.).

The memory 610 may include random access memory (RAM), read only memory (ROM), flash RAM, and/or other types. The memory 610 may store computer-readable, computer-executable software/firmware code 615 including instructions that, when executed, cause the processor module 605 to perform various functions described in this disclosure (e.g., activating one or more external cameras, receiving and analyzing one or more audiovisual data from the external camera, activating an emergency surveillance system, etc.). Alternatively, the software/firmware code 615 may not be directly executable by the processor module 605 but may cause a computer (e.g., when compiled and executed) to perform functions described herein. Alternatively, the computer-readable, computer-executable software/firmware code 615 may not be directly executable by the processor module 605 but may be configured to cause a computer (e.g., when compiled and executed) to perform functions described herein. The processor module 605 may include an intelligent hardware device, e.g., a central processing unit (CPU), a microcontroller, an application-specific integrated circuit (ASIC), etc.

The memory 610 can contain, among other things, the Basic Input-Output system (BIOS) which may control basic hardware and/or software operation such as the interaction with peripheral components or devices. For example, the emergency module 645 and/or external camera module 415-b which implements the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 630, one or more antennas 635, etc.).

Many other devices and/or subsystems may be connected to one or may be included as one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily known in the art and are not discussed in detail in this application. Code to implement the present disclosure can be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The transceiver module 630 may include a modem configured to modulate the packets and provide the modulated packets to the antennas 635 for transmission and/or to demodulate packets received from the antennas 635. While the external camera 405-b may include a single antenna 635, the external camera 405-b may have multiple antennas 635 capable of concurrently transmitting and/or receiving multiple wireless transmissions.

Figure 7:
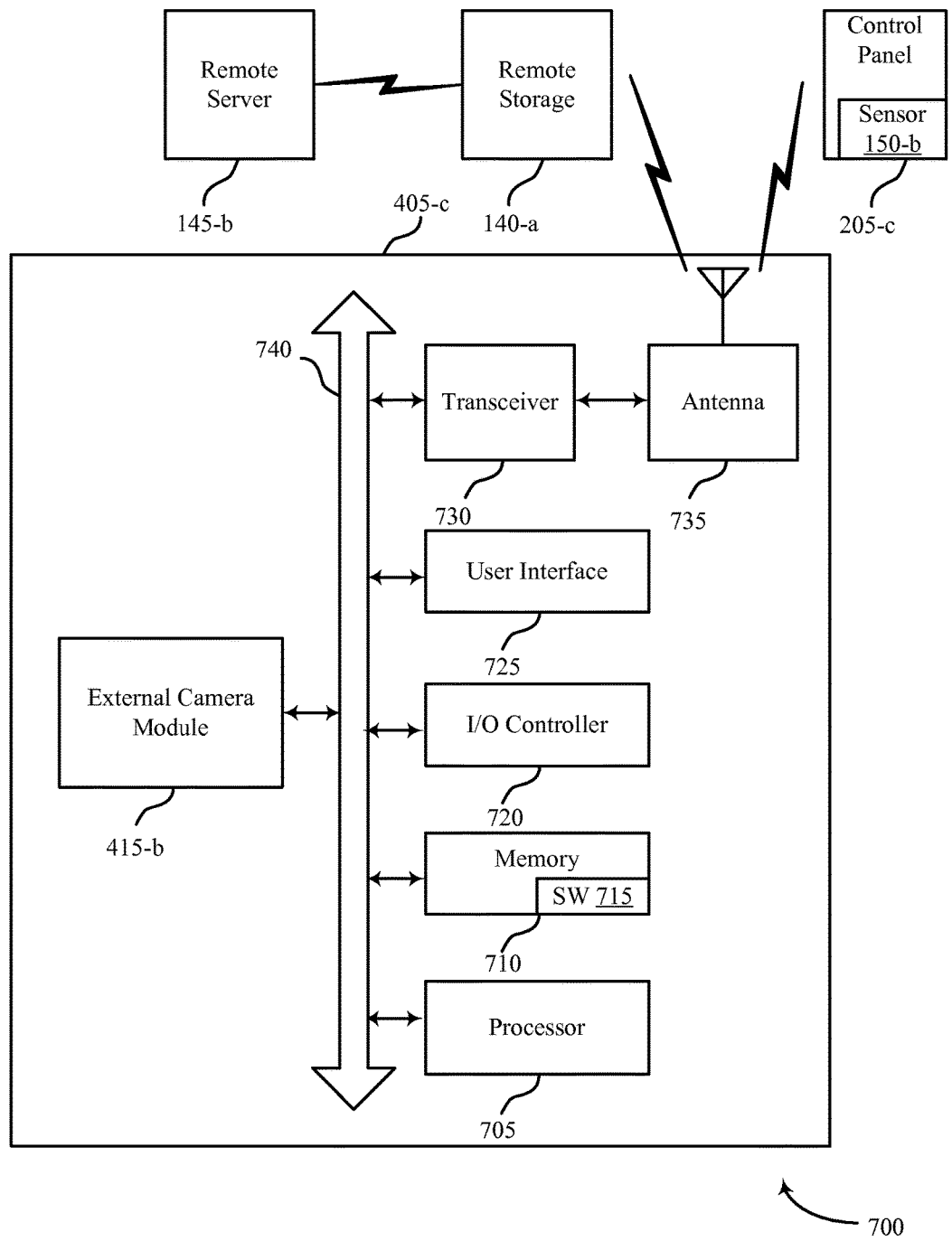
FIG. 7 shows a block diagram relating to a security and/or an automation system, in accordance with various aspects of this disclosure.

FIG. 7 shows a system 700 for use in external surveillance systems, in accordance with various examples. System 700 may include an external camera 405-c, which may be an example of the external camera 155 of FIG. 1. External camera 405-c may also be an example of one or more aspects of external camera 405 and/or 405-a of FIGS. 4 and 5.

External camera 405-c may also include components for bi-directional voice and data communications including components for transmitting communications and components for receiving communications. For example, external camera 405-c may communicate bi-directionally with one or more of external cameras 405-c, one or more sensors 150-b, one or more control panels 205-c, remote storage 140-a, and/or remote server 145-b, which may be an example of the remote server of FIG. 1. This bi-directional communication may be direct (e.g., external camera 405-c communicating directly with remote storage 140-a) or indirect (e.g., external camera 405-c communicating indirectly with remote server 145-b through remote storage 140-a).

External camera 405-c may also include a processor module 705, and memory 710 (including software/firmware code (SW) 715), an input/output controller module 720, a user interface module 725, a transceiver module 730, and one or more antennas 735 each of which may communicate—directly or indirectly—with one another (e.g., via one or more buses 740). The transceiver module 730 may communicate bi-directionally—via the one or more antennas 735, wired links, and/or wireless links—with one or more networks or remote devices as described above. For example, the transceiver module 730 may communicate bi-directionally with one or more of external camera 405-c, remote storage 140-a, and/or remote server 145-b. The transceiver module 730 may include a modem to modulate the packets and provide the modulated packets to the one or more antennas 735 for transmission, and to demodulate packets received from the one or more antenna 735. While a control panel or a control device (e.g., 205-b) may include a single antenna 735, the control panel or the control device may also have multiple antennas 735 capable of concurrently transmitting or receiving multiple wired and/or wireless transmissions. In some embodiments, one element of external camera 405-c (e.g., one or more antennas 735, transceiver module 730, etc.) may provide a direct connection to a remote server 145-b via a direct network link to the Internet via a POP (point of presence). In some embodiments, one element of external camera 405-c (e.g., one or more antennas 735, transceiver module 730, etc.) may provide a connection using wireless techniques, including digital cellular telephone connection, Cellular Digital Packet Data (CDPD) connection, digital satellite data connection, and/or another connection.

The signals associated with system 700 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 735 and/or transceiver module 730 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 735 may receive signals or information specific and/or exclusive to itself. In other embodiments, each antenna 735 may receive signals or information not specific or exclusive to itself.

In some embodiments, one or more sensors 150-b (e.g., motion, proximity, smoke, light, glass break, door, window, carbon monoxide, and/or another sensor) may connect to some element of system 700 via a network using one or more wired and/or wireless connections.

In some embodiments, the user interface module 725 may include an audio device, such as an external speaker system, an external display device such as a display screen, and/or an input device (e.g., remote control device interfaced with the user interface module 725 directly and/or through I/O controller module 720).

One or more buses 740 may allow data communication between one or more elements of external camera 405-*c* (e.g., processor module 705, memory 710, I/O controller module 720, user interface module 725, etc.).

The memory 710 may include random access memory (RAM), read only memory (ROM), flash RAM, and/or other types. The memory 710 may store computer-readable, computer-executable software/firmware code 715 including instructions that, when executed, cause the processor module 705 to perform various functions described in this disclosure (e.g., activate one or more audio, visual, audio-visual components, transmit observed data, etc.). Alternatively, the software/firmware code 715 may not be directly executable by the processor module 705 but may cause a computer (e.g., when compiled and executed) to perform functions described herein. Alternatively, the computer-readable, computer-executable software/firmware code 715 may not be directly executable by the processor module 705 but may be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc.

The memory 710 can contain, among other things, the Basic Input-Output system (BIOS) which may control basic hardware and/or software operation such as the interaction with peripheral components or devices. For example, an external camera module 415-*b* to implement the present systems and methods may be stored within the system memory 710. Applications resident with system 700 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 730, one or more antennas 735, etc.).

Many other devices and/or subsystems may be connected to one or may be included as one or more elements of system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 7 need not be present to practice the present systems and methods. The devices and subsystems can be interconnected in different ways from that shown in FIG. 7. In some embodiments, an aspect of some operation of a system, such as that shown in FIG. 7, may be readily known in the art and are not discussed in detail in this application. Code to implement the present disclosure can be stored in a non-transitory computer-readable medium such as one or more of system memory 710 or other memory. The operating system provided on I/O controller module 720 may be iOS®, ANDROID®, MS-DOS®, MS-WINDOWS®, OS/2®, UNIX®, LINUX®, or another known operating system.

The transceiver module 730 may include a modem configured to modulate the packets and provide the modulated packets to the antennas 735 for transmission and/or to demodulate packets received from the antennas 735. While the control panel 205-*c* may include a single antenna 735, the control panel 205-*c* may have multiple antennas 735 capable of concurrently transmitting and/or receiving multiple wireless transmissions.

The external camera 405-*c* may include the external camera module 415-*b*, which may perform the functions described above for the external camera module 415 of external camera 405 of FIGS. 4 and 5.

Figure 8:
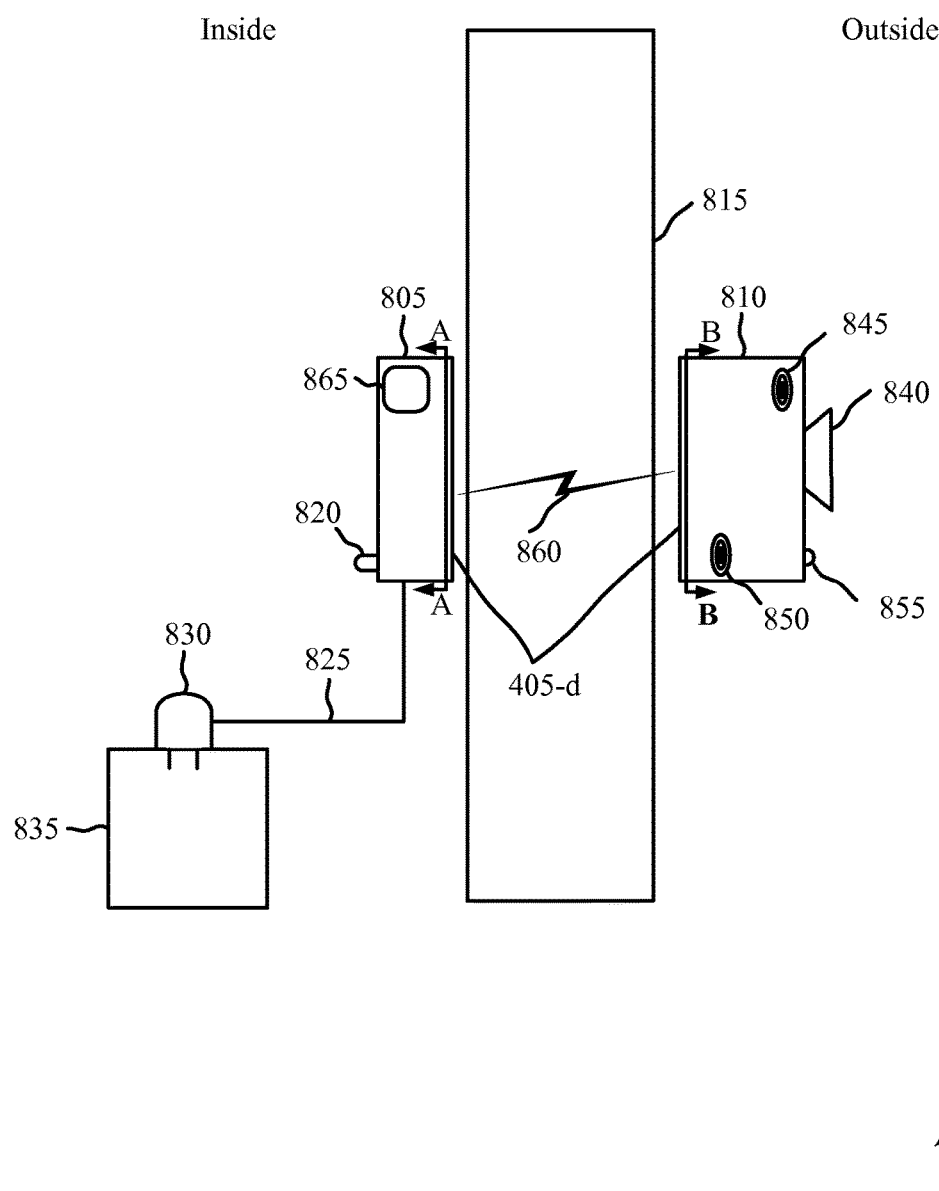
FIG. 8 shows a block diagram relating to a security and/or an automation system, in accordance with various aspects of this disclosure.

FIG. 8 shows a system 800 for use in external surveillance systems, in accordance with various examples. System 800 may include an external camera 405-*d*, which may be an example of the external camera 155 of FIG. 1. The external camera 405-*d* may also be an example of one or more aspects of external cameras 405, 405-*a*, 405-*b*, and/or 405-*c* of FIGS. 4-7. The external camera 405-*d* may consist of a first half 805 inside a building, and a second half 810 outside the building. A divider 815 may separate the first half 805 and the second half 810. The divider 815 may include a wall, window, door, or the like. The divider 815 may define a predetermined distance between the first half 805 and the second half 810. In some embodiments, the second half 810 may additionally be inside the building and instead of an exterior divider 815 separating the two halves 805, 810, an interior portion of the building may be separating the halves.

The first half 805 of the external camera 405-*d* may comprise a first activation light source 820, a dedicated power line 825 connected to a plug unit 830, and a rechargeable battery 865. The first activation light source 820 may illuminate a light, such as an LED, when the two halves 805,810 of the external camera 405-*d* are in communication as discussed below. The dedicated power line 825 and plug unit 830 may connect the first half 805 of the external camera 405-*d* to a continuous power supply 835, such as an outlet in a home or business. In some embodiments, the first half 805 may additionally and/or alternatively include one or more of a bus, a transceiver, an antenna, a user interface, a I/O controller, a memory, and/or a processor. The components may facilitate communication with a control panel and/or with the second half 810 of the external camera 405-*d*.

The second half 810 of the external camera 405-*d* may comprise an image gathering apparatus 840, an audio recording apparatus 845, a speaker 850, and a second activation light source 855. The image gathering apparatus 840 may comprise a camera, video recorder, or the like. The image gathering apparatus 840 may comprise a variety of cameras. For example, the camera may comprise a digital camera. The camera may comprise a low voltage camera (e.g. a 3V or lower) or a high voltage camera (e.g. greater than 3V). The voltage range of the camera may determine the quality of the images gathered and may be defined and/or limited by the power source.

The image gathering apparatus 840 may record and/or transmit still images and/or video images to the second half 810 of the camera, to a local memory (not shown) (e.g. memory 710), to a control panel (e.g. control panel 205), or the like.

The audio recording apparatus 845 may record audio data proximate the external camera 405-*d*. In some embodiments, the audio recording apparatus 845 may comprise a microphone. The audio data collected may comprise any sound over a predetermined decibel level. The speaker 850 may emit sound. The sound may comprise an alert, a recording, or the like. The second activation light source 855 may illuminate when the second half 810 of the external camera 405-*d* is connected to an active power source.

The second half 810 of the external camera 405-*d* may additionally comprise one or more components shown in FIG. 7 with reference to external camera 405-*b*. For example, the second half 810 of the external camera 405-*d* may comprise one or more of a bus, a transceiver, an antenna, a user interface, a I/O controller, a memory, and/or a processor. The components may facilitate communication with the control panel and/or with the second half 810 of the external camera 405-*d*.

The first half 805 and second half 810 of the external camera 405-*d* may communicate via connection 860 across the divider 815. The connection 860 may represent one or more of a power connection, a magnetic connection, or a data connection. The divider 815 may comprise a wall, a window, a door, or the like.

The power connection may comprise an induction power connection wherein power may be transmitted between the two halves 805, 810 through the use of an electromagnetic field. For example, the first half 805 may comprise an electricity transmission unit and the second half 810 may include an electricity receiving unit which may power the image gathering apparatus 840, audio recording apparatus 845, speaker 850 and other components proximate the second half 810. In some embodiments, the induction power connection may comprise resonant inductive coupling. In the example provided, each half 805, 810 of the external camera 405-*d* may comprise one or more components unique to induction power transfer. The electricity transmission unit of the first half 805, which is connected to the continuous power supply 835, may include an induction coil which may create an alternating electromagnetic field. The electricity receiving unit of the second half 810 of the external camera 405-*d* may include a second induction coil which may receive the power from the electromagnetic field and convert it back to an electrical current. The electrical current may power the camera proximate the second half. This will be discussed further with reference to FIG. 9. When the power supply is active and the second half 810 is receiving electricity, the first activation light source 820 and/or the second activation light source 855 may illuminate.

In some embodiments, the second half 810 may include a rechargeable battery (not shown). The rechargeable battery may store any excess power transferred to the second half 810 and act as an emergency power support should the power go out on the first half 805. Additionally, the first half 805 may comprise a rechargeable battery 865 which may be charged using the continuous power supply 835. The rechargeable battery 865 may continue to supply power to the second half 810 in the event of a power outage. In another embodiment, the battery may be used as a primary power source. The battery may charge and store power which may be a higher power reserve available from the inductive coil. The high power reserve may allow the unit to perform functions not normally active while in a lower power state, including but not limited to powering image capture, image analysis, communication, two way audio communication, etc.

The magnetic connection may comprise a magnetic field between two components proximate the first and second halves 805, 810 of the external camera 405-*d*. The strength of the magnetic field may overcome the force of gravity and allow the two halves 805, 810 of the external camera 405-*d* to remain in an suspended position on the divider 815 without altering the divider 815. The magnetic force may be created by two magnets each within a half 805, 810 of the external camera 405-*d* in proximate position to align. In other embodiments, only one side may comprise a magnet and the other may comprise a material attracted to a magnetic force which may create the magnetic connection. The magnetic connection may allow the halves 805, 810 to adhere to the divider 815 with the need for permanent or semi-permanent mounting features.

The data connection may include a near field communication (NFC) protocol. The near NFC may allow the two halves 805, 810 of the external camera 405-*d* to communicate with each other using radio communication. The NFC protocol may use electromagnetic induction between two loops antennas respectively proximate each half 805, 810 of the external camera 405-*d*. The two loops antennas may comprise the same antennas used for the induction power, or may comprise an additional set of loop antennas. In further embodiments, the data connection may include optical data transfer. The two halves 805, 810 of the external camera 405-*d* may comprise one or more devices capable of optically transferring data from the second half 810 to the first half 805. If data is transferred from the second half 810 to the first half 805, the first half 805 may transfer the data to a control panel or another receiving device.

Figure 9:
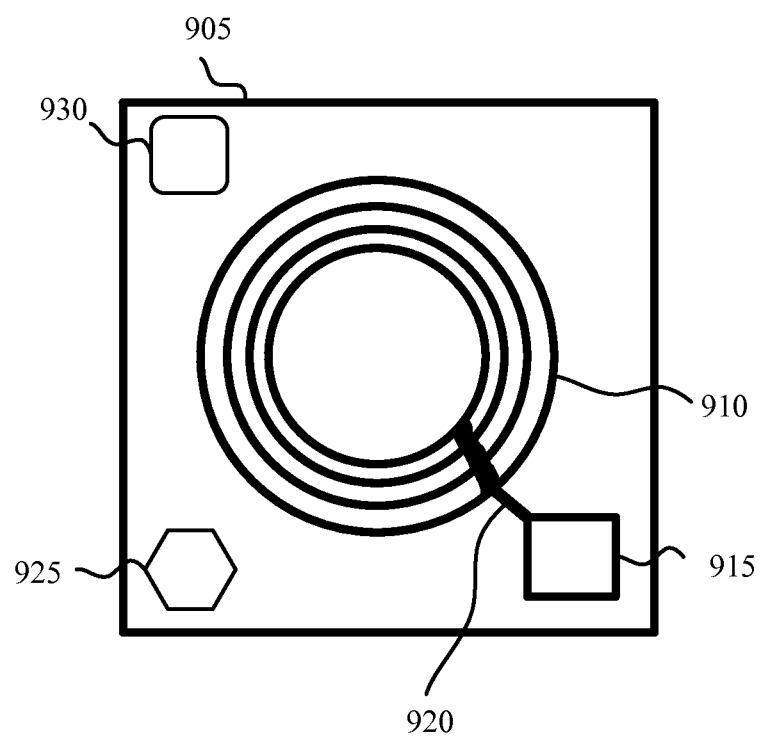
FIG. 9 shows a block diagram relating to a security and/or an automation system, in accordance with various aspects of this disclosure.

FIG. 9 shows a system 900 for use in external surveillance systems, in accordance with various examples. System 900 may comprise a component 905 of the external camera (e.g. external camera 405, 405-*a*, 405-*b*, 405-*c*, and 405-*d*). The component 905 of the external camera may represent either a first half 805 or a second half 810 as described with reference to FIG. 8. The view shown is an exemplary cutaway view looking at the camera half from the building viewpoint as represented by arrows A and/or B in FIG. 8. The component 905 may include an induction coil 910, a chip 915, connecting wires 920, one or more magnets 925, and/or one or more data transferring devices 930.

The induction coil 910 may transmit and/or receive power in conjunction with a chip 915 connected to the induction coil 910 via one or more connecting wires 920. For example, if the induction coil 910 is on the side with the continuous power source (e.g. continuous power supply 835), the chip 915 may convert the electrical current to a magnetic field with lines of electrical force. The power side coil may ring with an oscillating current creating an oscillating magnetic field. This may create an electricity transmission unit. A second coil, the induction coil 910 on a receiving end (e.g. first half 805), may pick up the energy generated by the oscillating magnetic current. The current may resonate with the receiving coil. The chip 915 may convert the energy back into an electrical current and use the electrical current to power one or more devices proximate the receiving end such as a camera, audio receptor, or the like. This may comprise the electricity receiving unit.

The magnet 925 may have a complimentary magnet in the opposing half of the camera. The two magnets may align when the two halves of the camera align and cause the camera to essentially mount to a dividing apparatus such as a window or wall. The magnet 925 may represent a singular magnet or a multitude of magnets strategically placed around the component 905. The magnets 925 may allow the two halves of the external camera to align, ensuring the other devices proximate the component 905 align. For example, the magnets 925 may ensure the electricity transmission unit and electricity receiving unit align.

The data transferring device 930 may comprise one or components for wirelessly transferring data between the two halves of the camera. The wireless transfer may comprise any type of short distance transfer mediums. For example, the data transferring device 930 may comprise a coil for near field communication protocol. In another embodiment, the data transferring device 930 may comprise one or more optical components for optically transferring data between the two halves. The optical data transfer may only work if the two halves of the camera are mounted on a transparent surface.

Figure 10:
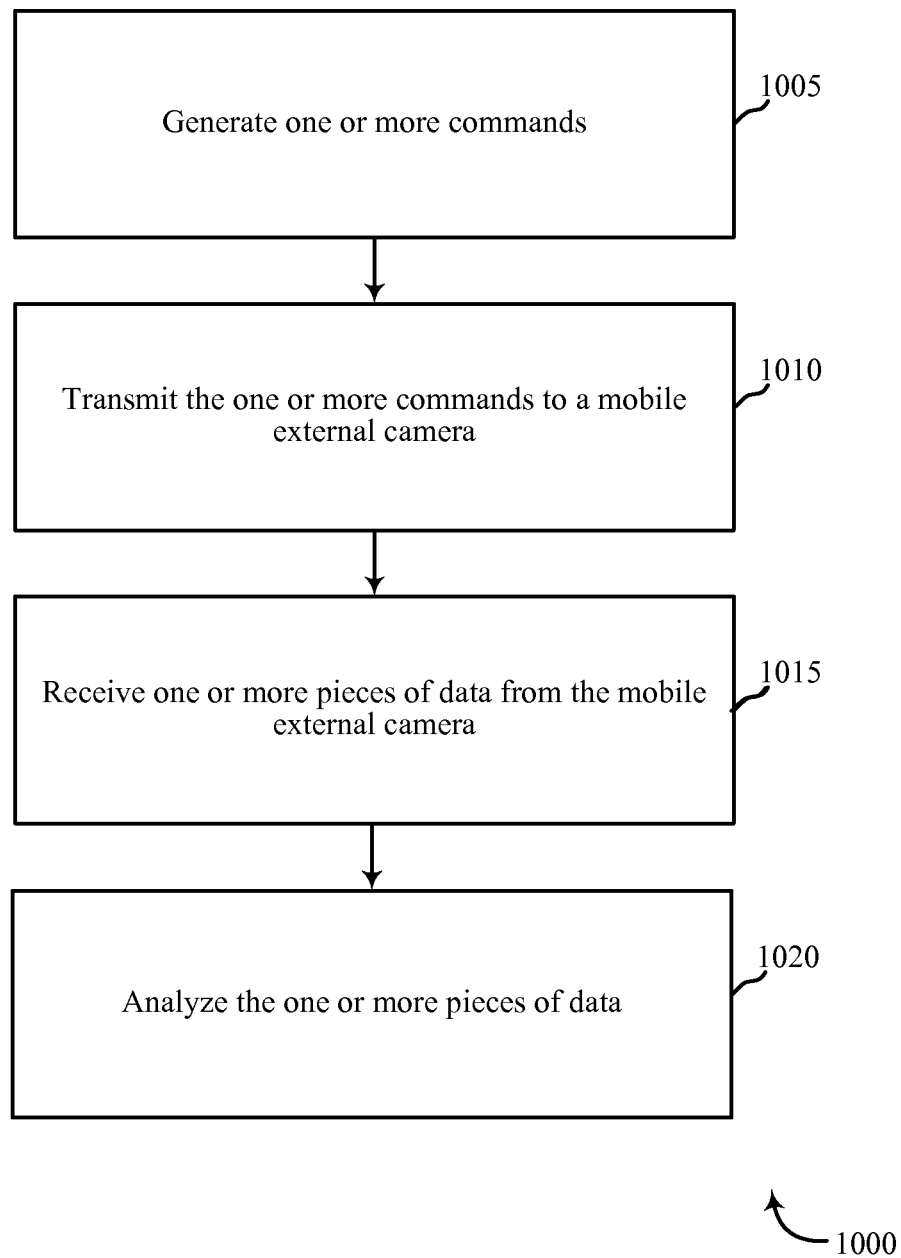
FIG. 10 is a flow chart illustrating an example of a method relating to a security and/or an automation system, in accordance with various aspects of this disclosure.

FIG. 10 is a flow chart illustrating an example of a method 1000 for monitoring external environments, in accordance with various aspects of the present disclosure. For clarity, the method 1000 is described below with reference to aspects of one or more of the control panel 205 described with reference to FIG. 2, 3, or 6, and/or aspects of one or more of the external camera described with reference to FIG. 4, 5, or 7-9. In some examples, a the control panel may execute one or more sets of codes to control the functional elements of the external camera to perform the functions described below. Additionally or alternatively, the control panel may perform one or more of the functions described below using special-purpose hardware.

At block 1005, the method 1000 may include generating one or more commands. The commands may be specific to a mobile external camera. More specifically a two-piece unit which may comprise a first half internal to a building and a second half external to a building wherein a piece of the building such as a glass or wall may separate the two halves. The commands may activate or deactivate one or more aspects of the camera, receive one or pieces of data form the camera, and the like. The camera may be equipped with a rotating camera lens capable of viewing multiple options; the camera may capture moving and/or still images. Additionally, the camera may have an microphone or audio receiving unit. The control panel may activate or deactivate any of these aspects of the camera and additionally request any necessary files or data be transferred to the control panel. At block 1010, the method 1000 may include transmitting one or more commands to the mobile external camera.

The operation(s) at block 1005 and 1010 may be performed using the command module 310 described with reference to FIG. 3.

At block 1015, the method 1000 may include receiving one or more pieces of data from the mobile external camera. At block 1020, the method 1000 may include analyzing the one or more pieces of data. Analyzing the data may comprise isolating any audio data with specific identifiable sound characteristics such as glass breaking, dog barking, human voices, gunshots, and the like. Analyzing an image may comprise isolating any image data with specific image requirements such as a person, or a time frame, or motion, or the like.

The operation(s) at blocks 1015 and 1020 may be performed using the analysis module 315 described with reference to FIG. 3.

Thus, the method 1000 may provide for analyzing one or more pieces of data collecting by a mobile camera unit relating to automation/security systems. It should be noted that the method 1000 is just one implementation and that the operations of the method 1000 may be rearranged or otherwise modified such that other implementations are possible.

It should be noted that the method 1000 is just example implementations. The operations of the method 1000 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. An apparatus for security and/or automation systems, comprising:
   a first half of the apparatus, the first half of the apparatus comprising an internal half of the apparatus configured to be located inside a building;
   an electricity transmission unit positioned within the first half;
   a first light source included in the first half of the apparatus, wherein the first light source illuminates when the electricity transmission unit is activated;
   a first rechargeable battery included in the first half of the apparatus, wherein the first rechargeable battery charges using a continuous power supply located inside the building;
   a second half of the apparatus positioned on a divider configured to separate the inside of the building from the outside of the building, the second half of the apparatus comprising an external half of the apparatus configured to be located outside the building;
   an electricity receiving unit included in the external half of the apparatus and positioned a predetermined distance away from the electricity transmission unit;
   a second light source included in the second half of the apparatus, wherein the second light source illuminates when first half of the apparatus is in communication with the second half of the apparatus;
   a camera included in the external half of the apparatus, the camera powered by a portion of power received by the electricity receiving unit; and
   a second rechargeable battery included in the second half of the apparatus, wherein the second rechargeable battery stores a remaining portion of the power received by the electricity receiving unit.

2. The apparatus of claim 1, further comprising:
   a first magnet proximate the first half;
   a second magnet proximate the second half;
   wherein the first and second magnet are positioned to align the electricity transmission unit and the electricity receiving unit.

3. The apparatus of claim 1, wherein the second light source illuminates when the electricity receiving unit is activated.

4. The apparatus of claim 3, wherein activating the electricity receiving unit comprises transferring power from the electricity transmission unit to the electricity receiving unit.

5. The apparatus of claim 1, further comprising:
   an antenna proximate the second half.

6. The apparatus of claim 1, further comprising:
   an audio recording device proximate the second half, the audio recording device powered by the electricity receiving unit.

7. The apparatus of claim 1, wherein the electricity transmission unit comprises:
   a coil of wire;

a chip proximate the coil of wire, connecting to the coil of wire via a connecting wire; and a continuous power supply proximate the coil of wire.

8. The apparatus of claim 7, wherein the electricity receiving unit comprises:

a second coil of wire;

a second chip proximate the second coil of wire, connecting to the second coil of wire via a second connecting wire; and the camera proximate the second chip, positioned to receive a source of power from the second chip and the second coil of wire.

9. The apparatus of claim 1, further comprising:

an optical data transmission unit proximate the second half;

an optical data receiving unit proximate the first half, where the optical data transmission unit and the optical data receiving unit are positioned to transmit data there between.

10. The apparatus of claim 1, further comprising:

a speaker proximate the second half.

11. The apparatus of claim 1, wherein the first half and second half transfer data via a near field communication protocol.

12. The apparatus of claim 1, wherein the first half of the apparatus is positioned inside the building and the second half of the apparatus is positioned outside the building.

13. An apparatus for security and/or automation systems, further comprising:

a first half of the apparatus, the first half of the apparatus comprising an internal half of the apparatus configured to be located inside a building;

an electricity transmission unit positioned within the first half;

a first light source included in the first half of the apparatus, wherein the first light source illuminates when the electricity transmission unit is activated;

a first rechargeable battery included in the first half of the apparatus, wherein the first rechargeable battery charges using a continuous power supply located inside the building;

a second half of the apparatus positioned on a divider configured to separate the inside of the building from the outside of the building, the second half of the apparatus comprising an external half of the apparatus configured to be located outside the building;

an electricity receiving unit included in the external half of the apparatus and positioned a predetermined distance away from the electricity transmission unit;

a second light source included in the second half of the apparatus, wherein the second light source illuminates when first half of the apparatus is in communication with the second half of the apparatus;

a camera included in the external half of the apparatus, the camera powered by a portion of power received by the electricity receiving unit; and a second rechargeable battery included in the second half of the apparatus, wherein the second rechargeable battery stores a remaining portion of the power received by the electricity receiving unit;

a processor;

memory in electronic communication with the processor; and instructions stored in the memory, the instructions being executable by the processor to:

activate the camera based at least in part on one or more commands.

14. The apparatus of claim 13, wherein the instructions are further executable to:

stream image data to a control panel in response to the one or more commands.

15. The apparatus of claim 13, wherein the instructions are further executable to:

connect to a control panel associated with an automation system.

16. The apparatus of claim 13, wherein the instructions are further executable to:

rotate a viewing point of the camera.

17. The apparatus of claim 13, wherein the first half of the apparatus is positioned inside the building and the second half of the apparatus is positioned outside the building.

* * * * *